United States Patent Office 3,342,555
Patented Sept. 19, 1967

3,342,555
PROCESS FOR THE PREPARATION OF LIGHT WEIGHT POROUS CARBON
William J. McMillan, Midland, Mich., assignor to The Dow Chemical Company, Midland, Mich., a corporation of Delaware
No Drawing. Filed June 19, 1961, Ser. No. 117,796
6 Claims. (Cl. 23—209.4)

This invention relates to a light weight porous carbon and a method for its preparation.

Carbon has been made in porous form for a number of years. However, the density of the porous carbon material of any appreciable strength heretofore available was not greatly less than the non-porous structure. While this porous carbon material can be used for many purposes, it is too heavy in many applications especially where weight is a critical factor. Porous carbon is relatively inert and can be used for many purposes such as insulation, filter, catalyst carrier, adsorbent, material of construction, and the like. It also has other applications specifically related to aircraft and missiles where weight of the material is a critical factor.

It is therefore an object of this invention to provide a light weight carbon foam having good strength properties. It is a further object of this invention to provide a process for the preparation of the porous carbon. Another object is to provide a foamed carbon mass having unexpected absorbent properties.

The above and other objects of the invention are attained according to the invention by foaming particular polymers to obtain a fine celled foam and then heating this foam under particular conditions to carbonize it. By the invention light weight open celled carbon structures are obtained having various apparent densities and may be as light as ½ pound per cubic foot.

The polymers or resins which may be foamed and then carbonized to form porous light weight carbon compositions are the polymers or resins which when cured consist of benzene rings bonded together on the average of not less than 2.5 bonds per benzene molecule. The bonding groups may be carbon, nitrogen, oxygen, or sulfur, but at least 65 percent of the groups must be carbon groups not exceeding 1 carbon atom. Illustrative examples of these resins are the phenolic-aldehyde resins of the resole or novolak type. Cresol, xylenol, trimethyl phenol, resorcinol, hydroquinone, and pyrocatechol, and pyrogallol, phloroglucinol, and benzenetriol are examples of some of the phenols and substituted phenols which may be polymerized with aldehydes to form polymers useful in the invention. In addition to formaldehyde which is the most widely used, other aldehydes such as furfural, acrolein, benzaldehyde and the like may also be polymerized with the phenolic monomer to form the thermosetting plastic foams to produce the light weight foamed carbonous product.

In addition to the phenolic-aldehyde polymers, examples of other polymers which may be used are homopolymers and copolymers of chloromethylated products of diphenyl oxide, phenylphenol, 4,4'-ditolylether and mixtures of these chloromethylated products such as 4,4'-dichloromethyldiphenol oxide.

In foaming of the particular polymers, the well known and accepted methods may be used. It is essential that the foam obtained be relatively homogeneous having cell sizes of approximately the same size throughout. Otherwise, stresses developed during the carbonization operation result in the breaking or cracking of the foamed carbon structure.

The crosslinked resins of phenol and aldehyde monomers or partially polymerized monomers are well-known and described in the art. In making foams from these monomers, it is desirable to begin with a homogeneous mixture. The usual procedure is to mix the phenol, aldehyde, and the blowing agent together to form a homogeneous composition, after which the catalyst is added. Also, a small amount of a surfactant may be added. The addition of a surfactant improves the foaming and may help to distribute the gas producers evenly throughout the mixture. When the catalyst has been mixed in thoroughly, the mixture is allowed to foam and polymerize. Molds or other means may be used to obtain a specifically shaped foam. The rate of polymerization and foaming is, of course, dependent on the phenol and aldehyde proportions, and the types of resins used, as well as on the type and amount of catalyst added. The time and temperature employed in the polymerization likewise varies with particular components used to make the foam. Usually, it is preferred to heat the monomers for several hours at temperatures from 70° to 90° C. This accelerates the curing of the resins.

Among the most commonly used foaming or blowing agents are the commercially available nitrogen releasing products such as azo compounds, N-nitroso compounds, sulphonhydrazides, acid azides, and guanyl compounds. Illustrative examples of some of these agents are N,N'-dimethyl, N,N'-dinitrosotherephthalamite, urea, oxalate, dinitrosopentamethylenetetramine, and azoisobutyricdinitrile.

Also suitable as blowing agents are volatile aromatics and hydrocarbons, or halogenated hydrocarbons having relatively low boiling points, including such materials as alkanes such as pentane and hexane and the chlorofluoroalkanes. Inorganic gas producers such as sodium bicarbonate may also be used. By varying the foaming agents and temperature, foams of densities from ½ to 30 lbs./ft.$^3$ suitable for carbonization can be obtained.

In making foamed polymers from the chloromethylated monomers described above, a Friedel-Craft type catalyst such as aluminum chloride, zinc chloride, ferric chloride, boron trifluoride or ferric or ferrous phosphate may be added in the amount of .25 to 2.0% to effect the polymerization at approximately 130° C. The polymerization produces gaseous HCl which acts as the blowing agent to obtain the foamed polymer structure. Thus these types of monomers act as a self-foaming material.

After the foam has set and is cured, it is preheated gradually from room temperature or the curing temperature to about 800° C. In this preliminary preheat stage, it is essential that the temperature increase be less than 20° C. per minute, preferably less than 10° C. per minute for larger pieces. During this stage the readily volatile matter is released, and it is essential that this preheating step be carried out slow enough to allow for the diffusion of the volatile matters out from the center of the foamed mass. For larger pieces or complicated forms it may be desirable to heat the piece at a rate of about 1° C. per minute. Above 800° C. the rate of heating is less critical and a faster rate may be used, if desired.

The final carbonization is carried out by heating the foamed pieces at a temperature of 800° C. to 1700° C. for about 30 minutes to 8 hours or until a substantial portion of the hydrogen is driven off. Sufficient time should be allowed for the carbon rearrangement to take place at this high temperature with the hydrogen given off so that a stabilized product is obtained. Generally a short time is required for smaller pieces and when the carbonization is carried out at a higher temperature. Thus for temperatures in the range of 1500° to 1700° C. a piece of a given size may be thoroughly carbonized and stabilized in about ½ to 1 hour, while it may require 8 hours at around 800° C. for a considerably larger piece. After the foam is stabilized and becomes carbonized, it can be repeatedly heated in an inert atmosphere to temperatures as high as 3000° C. and rapidly cooled without cracking or destruction of the piece taking place.

The preheating and carbonization steps may be carried out in an inert atmosphere using pressures above or below atmospheric pressure or under vacuum in absence of an inert atmosphere. Generally these steps are carried out in argon or nitrogen at a pressure close to atmospheric pressure.

During carbonization shrinkage is obtained so that in preparing of pieces allowance must be made. Generally, in forming a piece, the piece is made sufficiently larger so that even with a shrinkage the piece will be too large and may be finished to the desired dimensions by machining or the use of ordinary woodworking or metal working tools. Also various fillers may be added prior to the foaming of the resins, such that the resulting foamed carbon mass comprises the carbonous structure heretofore described and the filler embodied therein, for example graphite, coke, or lampblack but not necessarily limited to these materials.

The following examples will further illustrate the invention.

*Example I*

A phenolic foam was made by mixing 80 grams of anhydrous phenol-formaldehyde resole type resin with 240 grams of a phenol-formaldehyde resole type resin containing 30 weight percent water with a power mixer. Chlorofluoromethane in an amount of 30 milliliters was added with 32 grams of sulphonhydrazide which served as a foaming powder. After the chlorofluoromethane and the sulphonhydrazide type powder were intermixed with the resin, 32 grams of an acid catalyst was added to set and cure the resin. The catalyst was blended into the mixture by hand.

The mixture thus prepared was transferred to a plywood mold and placed in an oven which was heated to 85° C. where the foaming occured. The foam was cured for ½ hour in the 85° oven. The product when removed from the mold was a rigid, fine-celled foam with a density of approximately 2.2 pounds per cubic foot.

A sample of this foam was placed in the furnace and the furnace purged with argon. The sample was heated to 1500° C. in 1 hour and 35 minutes and held at 1500° C. for 15 minutes and then allowed to cool. The product obtained was a fine-celled, porous carbon structure or carbon foam.

The physical properties of the porous carbon product and the foam prior to heating is shown in the table below.

| Property | Before Heating | After Heating |
|---|---|---|
| Percent open cells | 100 | 95.8 |
| Flex. strength (1″ x 0.5″ x 2″) | 29.4 p.s.i. | 41.6 p.s.i. |
| Density | 2.21 lbs./cu. ft. | 2.54 lbs./cu. ft. |
| Cell size | 0.1 to 4 mm | .1 to .4 mm |
| Compressive strength | 29.6 p.s.i. | 49 p.s.i. |

*Example II*

In a manner similar to that described in Example I, 100 grams of anhydrous phenol formaldehyde resole resin was intermixed with 300 grams of a phenol formaldehyde resole resin containing 30% water. To the mixture, 20 cc. of the Freon 113 fluorocarbon and 40 grams of the foaming powder sulphonhydrazide were added with 40 cc. of acid catalyst. A foam was obtained having a density of about 5 pounds per cubic foot. A sample of this foam was heated to 2800° C. in an argon atmosphere. The porous carbon product obtained had a resistivity at room temperature of 0.158 ohms compared to about 50,000 megaohms for the foamed material prior to heat treatment.

Two other samples of the foam prepared above were heated in a furnace at 1000° C. and 1500° C., respectively, in an argon atmosphere. The foamed carbon product obtained had the following physical properties.

| | Sample 1 | Sample 2 |
|---|---|---|
| Temperature | 1,500° C | 1,000° C. |
| Time to temp | 1 hr. 15 mins | 1 hr. 45 mins. |
| Density | 4.43 lbs./cu. ft. | 4.74 lbs./cu. ft. |
| Percent original volume | 52 | 50.6. |
| Percent original weight | 52 | 53. |
| Cell size | .2 mm | .1 mm. |
| Percent open cells | 100 | 100. |
| Comp. strength | 63 p.s.i. | 105 p.s.i. |
| Flex. strength | 84 p.s.i. | 85 p.s.i. |

To illustrate the outstanding insulation properties in a manner similar to that above a carbon foam was made having an apparent density of 3.8 pounds per cubic foot. The product had a thermal conductivity of 0.388 B.t.u.=in./hr./sq. ft./° F. at a mean temperature of 70° F.

To illustrate the adsorption properties of the carbon foams, the carbon foam of sample 2 above was tested for its adsorption of N-butane and iso-butane. It was found that N-butane was adsorbed at room temperature at a rate of 0.36 cc. per gram of foam while isobutane was only adsorbed to the extent of 0.19 cc. per gram of foam. When the above was compared to two commercial grades of coconut charcoal, the adsorption for one of the charcoals was 0.2765 cc. per gram for N-butane and 0.2752 cc. per gram for iso-butane, while for the other charcoal the adsorption was .3958 cc. per gram and 0.3960 cc. per gram, respectively. It was surprising to find that the foam carbon acted as a molecular sieve and may be used to separate similar compounds N-butane and iso-butane when other carbons as coconut charcoal will not.

In a manner similar to that above foams made from 4,4'-dichloromethyldiphenyloxide were carbonized in a similar fashion to obtain a light weight foamed carbon structure.

What is claimed is:

1. A process for the preparation of a porous carbon material which comprises preheating a foamed polymer in an inert atmosphere to 800° C. at a rate less than 20° C. temperature rise per minute and thereafter heating the preheated foam to a temperature in the range of 800° to 1700° C., thereby to carbonize the foam, said foamed polymer being formed by intermixing monomers to form a polymer having benzene rings bonded together on the average by not less than 2.5 bonds per benzene molecule by bonding groups consisting of at least 65 percent of carbon groups not exceeding one carbon atom, foaming the intermixed monomers into fine celled foam, and subjecting the foam to a sufficient temperature to effect the polymerization reaction of the foamed monomers to form the foamed polymer.

2. A process for the preparation of porous carbon material which comprises preheating a foamed polymer in an inert atmosphere at a rate less than 20° C. per minute temperature rise to a temperature of 800° C. and thereafter heating the preheated foam to a temperature in the range of 950° to 1700° C. for a sufficient length of time to carbonize the foam, said foamed polymer being formed by intermixing a phenol and an aldehyde, in proportions to form a solid resin, with a blowing agent and a polymerization catalyst thereby to initiate the polymerization reaction between the phenol and the aldehyde, and heating the catalyst-containing mixture to a temperature sufficient to initiate the foaming and complete the polymerization reaction.

3. A process according to claim 2 wherein the phenol is hydroxybenzene and the aldehyde is formaldehyde.

4. A process for the prepartion of a porous carbon adsorbent material which comprises preheating a shaped mass of foamed resin to a temperature of 800° C. at the rate of from 10 to 20° C. temperature rise per minute and thereafter heating the preheated foam in an inert atmosphere to 1500° C. for from ½ to 8 hours, thereby to carbonize the foam, said foamed resin being formed by intermixing a phenol-formaldehyde resole type resin with chlorofluoromethane and sulfonhydrazide as foaming agents, adding an acid catalyst to initiate the cross-linking reaction between the phenol and formaldehyde, heating the catalyst-containing mixture to foam the mixture, forming the foamed mixture in a particular shaped mass and heating the shaped mass to a temperature in the range from 70 to 90° C. to complete the cross-linking reaction.

5. A process for the preparation of a porous carbon material which comprises preheating a shaped mass of foamed polymer to a temperature of 800° C. at a rate of from 10 to 20° C. temperature rise per minute and thereafter heating the preheated foam to from 800 to 1700° C. for sufficient time to carbonize the foam, said foam polymer being formed by intermixing a chloromethylated product selected from the group consisting of chloromethylated diphenyl oxide, chloromethylated phenylphenol, and chloromethylated 4,4'-ditolyl ether with a Friedel-Crafts type catalyst, heating the resulting mixture to foam the mixture, forming the foamed mixture in a particular shaped mass, and heating to polymerize the shaped mass.

6. A process according to claim 5 wherein the chloromethylated product is 4,4'-dichloromethyldiphenyloxide.

References Cited

UNITED STATES PATENTS

| | | | |
|---|---|---|---|
| 1,442,372 | 1/1923 | Wallerstein | 252—421 |
| 3,075,929 | 1/1963 | Hebert et al. | 260—2.5 |
| 3,121,050 | 2/1964 | Ford | 23—209.4 X |

OTHER REFERENCES

Lever: "Expanded and Foamed Materials," Plastics, August 1953, vol. XVIII, No. 193, pages 274–277.

OSCAR R. VERTIZ, *Primary Examiner.*

JULIUS GREENWALD, MAURICE A. BRINDISI, MORRIS O. WOLK, JOSEPH SCOVRONEK, *Examiners.*

R. D. LOVERING, R. D. EDMONDS, J. H. NEWSOME, E. J. MEROS, *Assistant Examiners.*